United States Patent
Rowell et al.

(10) Patent No.: US 11,773,925 B2
(45) Date of Patent: Oct. 3, 2023

(54) MODIFIED VEHICLE TRANSMISSION

(71) Applicant: Sonnax Transmission Company, Bellows Falls, VT (US)

(72) Inventors: Brian G. Rowell, Saxtons River, VT (US); Gregg A. Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 17/516,985

(22) Filed: Nov. 2, 2021

(65) Prior Publication Data

US 2022/0136573 A1 May 5, 2022

Related U.S. Application Data

(60) Provisional application No. 63/109,161, filed on Nov. 3, 2020.

(51) Int. Cl.
*F16D 47/00* (2006.01)
*F16D 25/10* (2006.01)
*F16H 57/00* (2012.01)

(52) U.S. Cl.
CPC ............ *F16D 47/00* (2013.01); *F16D 25/10* (2013.01); *F16H 2057/0075* (2013.01); *F16H 2200/0039* (2013.01)

(58) Field of Classification Search
CPC ........ F16H 2057/0075; F16H 2057/087; F16D 25/12; F16D 47/04; F16D 47/00; F16D 25/0638; B60K 17/02
See application file for complete search history.

(56) References Cited

U.S. PATENT DOCUMENTS

2017/0219091 A1 * 8/2017 Dial ................. F16H 61/30

FOREIGN PATENT DOCUMENTS

DE 102019115515 A1 * 12/2019 ........... F16D 13/648

* cited by examiner

*Primary Examiner* — Timothy Hannon
(74) *Attorney, Agent, or Firm* — Levenfeld Pearlstein, LLC

(57) ABSTRACT

A kit for modifying an OE vehicle transmission includes a replacement forward piston housing, forward clutch hub and a forward clutch and a replacement direct piston housing, direct clutch hub and a direct clutch. A drum extends between and operably connects the replacement forward piston housing and direct piston housing. The kit includes a replacement sprag shaft. The forward clutch hub and forward clutch and the direct clutch hub and direct clutch are positioned between the forward piston housing and the direct piston housing. At least a portion of the forward clutch and at least a portion of the direct clutch are operably mounted to the drum. The forward piston housing and direct piston housing do not counter rotate relative to one another. A power flow module for an OE vehicle automatic transmission is disclosed.

7 Claims, 5 Drawing Sheets

MODIFIED VEHICLE TRANSMISSION

CROSS-REFERENCE TO RELATED APPLICATION DATA

This application claims the benefit of and priority to Provisional U.S. Patent application Ser. No. 63/109,161, filed Nov. 3, 2020, titled, MODIFIED VEHICLE TRANSMISSION, the disclosure of which is incorporated herein in its entirety.

BACKGROUND

The following description relates generally to a vehicle transmission, for example, a modified version of a known vehicle transmission.

An original equipment ("OE") vehicle transmission is a transmission installed by the vehicle manufacturer during original assembly of the vehicle. The OE vehicle transmission includes OE parts, sub-parts and the like. In the following description, such OE transmissions, parts, sub-parts and the like may be preceded by the "OE" terminology.

An example of an OE transmission is the GM Turbo Hydra-Matic 400 transmission (THM400), developed by General Motors. The OE THM400 uses a Simpson planetary gear train with three forward speeds and reverse. The OE THM400 has been widely used in passenger and light truck fleets. The OE THM400 has evolved into the 4L80E four speed electronically controlled transmission. The OE THM400 has also been popular in automotive racing because it is generally robust and numerous gear ratios can be achieved through aftermarket sources. The OE THM400 may also be referred to herein as the "OE transmission."

FIG. 1 is a cross-sectional view illustrating a lower half of the known OE THM400 10. The OE THM400 10 includes an OE forward clutch drum 12 and an OE direct clutch drum 14. The OE forward clutch drum 12 and the OE direct clutch drum 14 are relatively large, heavy, cast iron clutch drums. The OE THM400 10 also includes an OE forward clutch 16 driven by the OE forward clutch drum 12. The OE forward clutch 16, when applied, drives an OE forward clutch hub 18 and an OE main shaft 20. The OE main shaft 20 drives the planet at a rear end of the OE THM400 10. In first gear, the OE direct clutch drum 14 is driven in a counterclockwise direction.

The OE THM400 10 further includes an OE intermediate clutch 22. When shifting from first gear to second gear, the OE intermediate clutch 22 is engaged, which locks an OE outer sprag race 24. Locking the outer sprag race has the effect of engaging OE intermediate sprags 24, 26, 28, which causes the counterclockwise rotating OE direct clutch drum 14 to halt by grounding the OE direct clutch drum 14 to an OE case of the OE transmission 10.

The OE THM400 10 further includes an OE direct clutch 30. When shifting from second gear to third gear, the OE direct clutch 30 is engaged, which causes the OE direct clutch drum 14 to be locked to and rotate in the clockwise direction with the OE forward clutch drum 12.

Thus, in the OE THM400 transmission 10, the OE direct clutch drum 14 is driven in a counterclockwise direction in first gear, halted in second gear, and driven in a clockwise direction in third gear.

The shift sequence of the OE THM400 transmission 10 can provide smooth shifting in an OEM vehicle. However, in racing applications, the rotational starting, stopping and change in direction of the OE direct clutch drum 14 may be experienced as lost momentum, lost engine RPM, lost power and lost speed, at least in part, because of the relatively massive OE direct clutch drum 14. Stress failures may also result from the starting, stopping, and changing directions of the OE direct clutch drum 14 in the shift sequence. Thus, the OE THM400 10 may not be suitable for use in vehicles intended for racing.

The racing aftermarket has attempted to reduce the impact of stopping, starting and changing direction of the rotating mass, i.e., the OE direct clutch drum 14. For example, attempts have been made to use smaller parts, thinner drums and/or lighter weight materials such as aluminum, titanium, and other similar, suitable relatively lightweight materials. It will also be understood that a transmission can be built using all aftermarket components, including, for example, an aftermarket case, gears, drums, control valves, and other hardware. The function and power flow in such aftermarket transmissions, however, remains the same as the OE design. Such attempts have yielded only incremental improvements.

FIG. 2 is a diagram illustrating a known aftermarket THM400 transmission 110, which is a modified version of the OE THM400 10. In the known aftermarket THM400 110, a small, lightweight input section is provided to change a power flow of the OE THM400. The input section, in effect, took the erratic rotation of the large, heavy OE direct clutch drum 14 and applied it to smaller internal parts. In this manner, the counter rotating mass can be decreased and efficiency can be increased.

The illustrated known aftermarket THM400 transmission includes a piston housing and drum 131/142, a forward piston 132, a forward clutch hub 133, a direct clutch hub 136, a direct piston 135, and a direct piston housing 134. A pressure plate 137 is positioned between the forward and direct drive pistons. Power is transmitted through a sprag shaft 138 and a sun shaft 116.

The known aftermarket THM400 of FIG. 2 was, however, often fabricated using, for example, relatively lightweight and/or thin-walled parts from other transmissions, machining, cutting, and welding pieces together until the transmission 110 operated as intended. Thus, it is difficult to reliably reproduce and/or perform future work on the known aftermarket THM400 transmission because the replacement/modified components and/or fabrication processes may vary from one attempt to another. In addition, the known aftermarket THM400 transmission was intended specifically for use in light weight, light duty vehicles, and may lack strength and durability for use in more demanding applications, such as automobile racing.

Accordingly, it is desirable to provide a modified OE transmission of a lighter weight and higher strength than the OE transmission so as to be suitable for racing applications.

SUMMARY

In embodiments, a kit for modifying an original equipment (OE) vehicle automatic transmission is disclosed. The OE transmission has a housing, an input shaft, a main shaft and a sun shaft. The OE transmission further includes a forward clutch drum operably mounted to the input shaft, a forward clutch hub positioned in the forward clutch drum and operably mounted to the main shaft and a forward clutch movable between an engaged state in which the forward clutch drum and the forward clutch hub rotate with one another and a disengaged state in which the forward clutch drum and the forward clutch hub do not rotate with one another.

The OE transmission further includes a direct clutch drum operably mounted to the sun shaft, a direct clutch hub operably mounted to the forward clutch drum and positioned in part in the direct clutch drum and a direct clutch movable between an engaged state in which the forward clutch drum and the direct clutch drum rotate with one another and a disengaged state in which the forward clutch drum and the direct clutch drum do not rotate with one another. Further still, the OE transmission includes an intermediate clutch operably mounted to the case and engages the intermediate sprag which is connected to the direct clutch drum.

In operation of the OE transmission, in a first gear, the forward clutch engages and the forward drum rotates in a first direction, the direct clutch disengages and the direct drum rotates in a second, opposite direction and the intermediate clutch is disengaged, in a second gear, the forward clutch engages and the forward drum rotates in the first direction, and the intermediate clutch engages stopping rotation of the direct drum, and in a third gear, the forward clutch engages and the forward drum rotates in a first direction, the direct clutch engages and the direct drum rotates in the first direction and the intermediate clutch engages.

The replacement kit includes a replacement forward piston housing, a replacement forward clutch hub and a replacement forward clutch, a replacement direct piston housing, a replacement direct clutch hub and a replacement direct clutch, a drum extending between and operably connecting the replacement forward piston housing and the replacement direct piston housing and a replacement sprag shaft.

In embodiments, the replacement forward clutch hub and the replacement forward clutch and the replacement direct clutch hub and the replacement direct clutch are positioned between the replacement forward piston housing and the replacement direct piston housing, with at least a portion of the replacement forward clutch and at least a portion of the replacement direct clutch operably mounted to the drum. And, the forward piston housing and the direct piston housing do not counter rotate relative to one another.

In aspects, the kit further includes a replacement forward piston and a replacement direct piston, such that the replacement forward piston is positioned in the replacement forward piston housing and the replacement direct piston is positioned in the replacement direct piston housing. The kit may further include a replacement intermediate clutch operably connected to the replacement sprag shaft.

In embodiments, the kit can include a pressure plate positioned between the replacement forward clutch and the replacement direct clutch and the pressure plate can be operable with either or both the replacement forward clutch and the replacement direct clutch.

In embodiments, the kit further includes a needle bearing positioned between the replacement forward piston housing and the replacement forward clutch hub and can include a needle bearing positioned between the replacement forward clutch hub and the replacement sprag shaft.

The kit can further include a bushing support positioned between the replacement direct piston housing and the replacement sprag shaft.

In another aspect, a power flow module for an original equipment (OE) vehicle automatic transmission includes a forward piston housing, a forward clutch hub and a forward clutch, a direct piston housing, a direct clutch hub and a direct clutch, a drum extending between and operably connecting the forward piston housing and the direct piston housing and a sprag shaft.

The forward clutch hub and the forward clutch and the direct clutch hub and the direct clutch are positioned between the forward piston housing and the direct piston housing. At least a portion of the forward clutch and at least a portion of the direct clutch are operably mounted to the drum. The forward piston housing and the direct piston housing do not counter rotate relative to one another.

In embodiments, the power flow module includes a forward piston and a direct piston. The forward piston is positioned in the forward piston housing and the direct piston is positioned in the direct piston housing. The module can further include an intermediate clutch operably connected to the sprag.

In embodiments, the power flow module can include a pressure plate positioned between the forward clutch and the direct clutch. The pressure plate cooperates with either or both the forward clutch and the direct clutch.

In embodiments, the module includes a needle bearing positioned between the forward piston housing and the forward clutch hub. The module can also include a needle bearing positioned between the forward clutch hub and the sprag shaft. In embodiments, the module can include a bushing support positioned between the direct piston housing and the sprag shaft.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
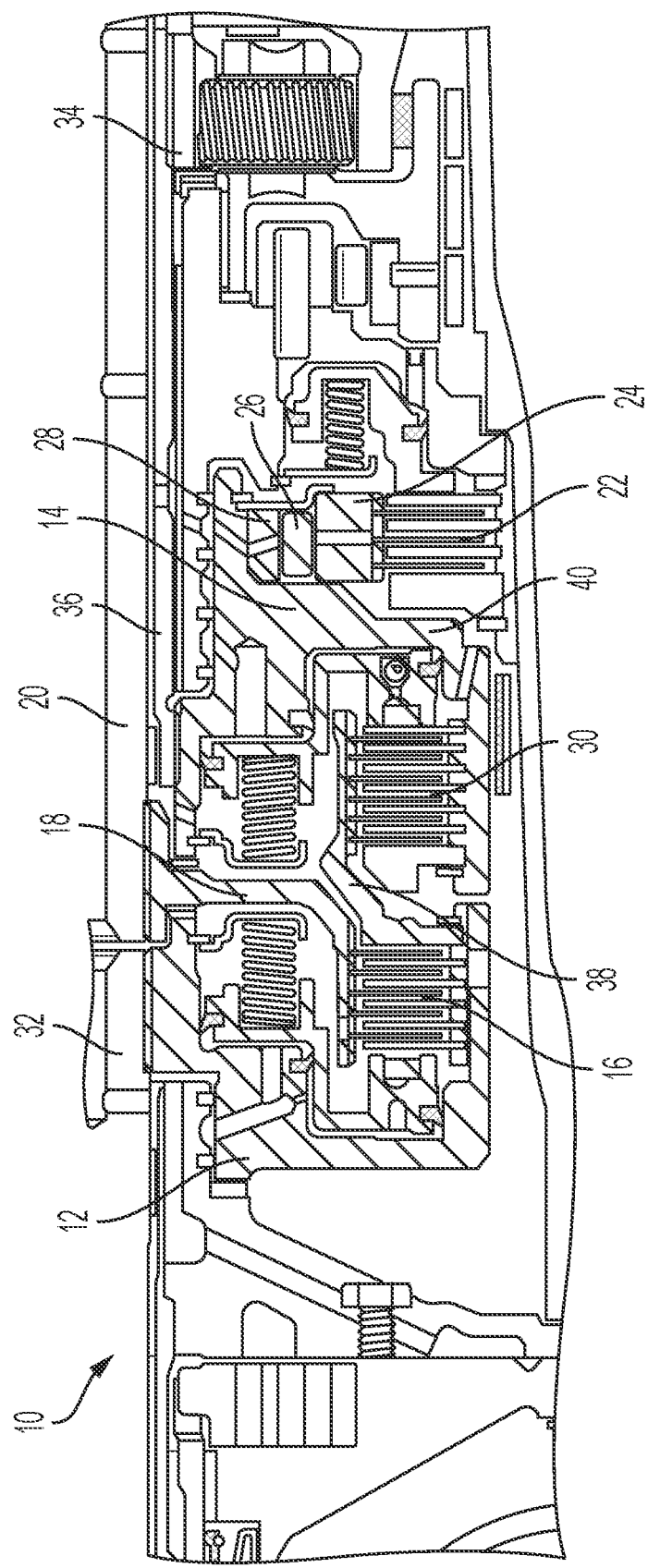
FIG. 1 is a diagram illustrating a lower half of a known OE transmission for a vehicle.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Referring to the known OE transmission shown in FIG. 1, a power flow varies depending on a selected gear. In neutral, an OE input shaft 32 from a torque converter turbine (not show) drives the OE forward clutch drum 12. No clutches are engaged so no power flows beyond the OE forward clutch drum 12.

In first gear, the OE forward clutch 16 is applied to engage the OE forward clutch hub 18. The OE forward clutch hub 18 is splined to the OE main shaft 20, which applies torque through the Simpson planet in the first gear output ratio. In reaction to torque applied through the OE Simpson planet, the OE Simpson planet sun gear 34 turns counterclockwise, which, being splined to the OE sun shaft 36, which is splined to the OE direct drum 14 also rotates in a counterclockwise direction at 80% of the input RPM. It will be appreciated that the 80% counterclockwise rotation is the OE gear ratio.

Aftermarket components may provide alternative gear ratios that may be more or less than 80%.

In second gear, the OE forward clutch 16 remains applied and the OE intermediate clutch 22 is applied holding the OE outer race 24 of the OE intermediate sprag 24/26/28. This engages the OE sprag 24/26/28 and halts the counterrotation of the OE sun gear 34 which stops counterrotation of the OE sun shaft 36 and the OE direct drum 14 it is splined to. In this configuration, power flows through the OE forward clutch 16, the OE forward clutch hub 18 and the OE main shaft 20 as it did in first gear. However, with the OE sun gear 34 held, power through the planet now results in a second gear ratio output.

In third gear, or direct drive (1:1), the OE forward clutch 16 and the OE intermediate clutch 22 remain applied. The OE direct clutch 30 is also applied, which causes the OE forward and direct drums 12, 14 to rotate together driving the OE main shaft 20 and OE sun shaft 36 which drives the planet system as one unit, outputting a 1:1 third gear ratio. During the shift from second gear to third gear the OE direct clutch drum 14 section moves from zero rpm to the input rpm.

Figure 3:
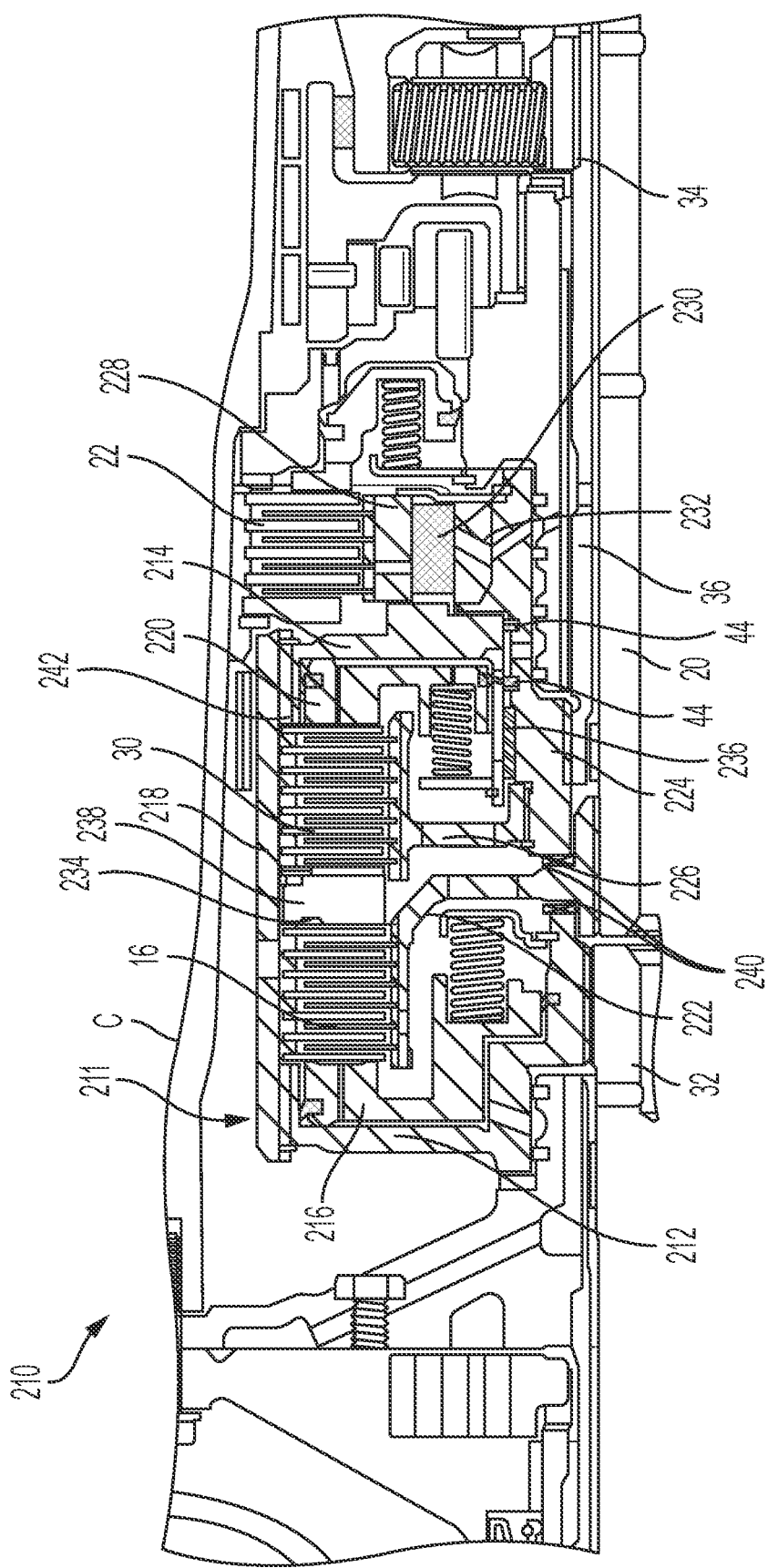
FIG. 3 is a diagram illustrating an upper half of a transmission for a vehicle according an embodiment.

FIG. 3 is a diagram illustrating an upper half of a transmission 210 according to an embodiment. The transmission 210 may be a modified version of a known OE transmission, such as the known OE THM400 transmission 10 shown in FIG. 1. Accordingly, the transmission 210 of the present embodiments may include some features of the known OE transmission 10, and such features maybe prefaced by the OE terminology in the following description. The transmission 210 according to the present embodiments may also be referred to herein as a modified transmission.

The transmission 210 may include a forward piston housing 212 and a direct piston housing 214. The transmission 210 may also include a forward piston 216, a drum 218 and a direct or rear piston 220. Power flow in the transmission 210 of the present embodiments may vary depending on the selected gear. In neutral, an OE input shaft 32 is configured to be driven by a torque converter turbine (not shown). The OE input shaft 32 may be operably connected to the forward piston housing 212 so that in neutral, the OE input shaft 32 may drive the forward piston housing 212, the forward piston 216 and the drum 218, as well as the direct piston housing 214 and the rear piston 220 in a clockwise rotation. In an embodiment, no power flows beyond this in neutral. The transmission 210 can be provided as a module 211.

In first gear, the OE forward clutch 16 is applied to engage a forward clutch hub 222 of the present embodiment. The forward clutch hub 222 is splined to the OE main shaft 20 which applies torque through the Simpson planet in a first gear output ratio. The OE Simpson planet reaction sun 34 drives the OE sun shaft 36 in a counterclockwise direction. The OE sun shaft 36 is splined to a sprag shaft 224 which is splined to a direct clutch hub 226, which may all counterrotate, for example, at 80% of the input rpm. The sprag shaft 224 and the direct clutch hub 226 may have a smaller diameter and much less mass than the OE direct drum assembly 14. It will be appreciated that the 80% counterrotation is the OE gear ratio. Aftermarket components may provide alternative gear ratios that may be more or less than 80%.

In second gear, the OE forward clutch 16 remains applied and the OE intermediate clutch 22 is applied, which holds the outer race 228 of the intermediate sprag 228/230/232. This engages the sprag halting the counter-rotation of the sprag shaft 224, OE sun shaft 36 and OE sun gear 34. The power may still flow through the OE forward clutch 16, the forward clutch hub 222 and the OE main shaft 20 as it did in first gear. However, with the OE sun gear 34 now fixed, the power through the planet results in a second gear ratio output.

In third gear, or direct drive (1:1), the OE forward clutch 16 and the OE intermediate clutch 22 remain applied. The OE direct clutch 30 is also applied causing the forward clutch hub 222 and a direct clutch hub 226 to rotate together in a clockwise direction and drive the OE main shaft 20 and the OE sun shaft 36 at the same speed which in turn drives the planet system as one unit, outputting 1:1 for a third gear ratio. During the shift from second gear to third gear, the direct clutch hub 226 and the sprag shaft 224 both move from zero RPM to an input RPM. However, because these parts are much smaller diameter and lighter than the OE direct clutch drum 14, efficiency of the transmission 210 in the present embodiments may be significantly improved compared to the OE transmission 10. That is, the configuration of the parts of the transmission 210 of the present embodiments, such as the direct piston housing 214, the sprag shaft 224 and the direct clutch hub 226, the parts may be made having a smaller diameter and lighter than the OE parts, such as the OE direct clutch drum 14.

In the present embodiments, a more robust, rigid, lightweight and modular design suitable for handling high horsepower, for example, as encountered in automotive racing applications.

Compared to the OE transmission 10, the transmission 210 of the present embodiments essentially combines the function of the OE forward clutch drum 12 and OE direct clutch drum 14 into a unit that rotates together. However, in the present embodiments, the OE direct clutch drum 14 is omitted. Instead, the present embodiments include two parts which separate two functions of the OE direct clutch drum 14: the direct piston housing 214 and the sprag shaft 224. In addition, an OE forward pressure plate 38 of the OE transmission 10 may be omitted in the transmission 210 of the present embodiments. Instead, the transmission 210 of the present embodiments may include a pressure plate 234 and the direct clutch hub 226. The pressure plate 234 may be a single pressure plate and may be shared between the forward clutch 16 and the direct clutch 30. The direct clutch hub 226 may be splined to the sprag shaft 224 and the sprag shaft 224 may be splined to the OE sun shaft 36 using a full length of the OE sun shaft 36 spline.

The present modified transmission 210 has a number of advantages over both the OE transmission and known aftermarket THM400 transmissions. For example, the present transmission 210 has a modular design, which is lacking in the OE and known aftermarket designs. Specifically, in the present transmission, in place of the forward and direct drums 12, 14, a single cylindrical part (drum) 218 with an internal spline throughout its length in which a forward piston housing 212 and a direct piston housing 214 are splined at each end is used.

The known aftermarket transmission uses an elongated forward drum splined to a direct piston housing. In the present transmission, the piston housings 212, 214 can be locked in place in a number of ways including using snap rings at each end of the drum 218. Other ways in which the piston housings 212, 214 can be locked in place include, for example, threading the parts together, joining with screws, pins, rivets, set screws, and the like. As such, the modular design of the present transmission provides ease of manufacture, ease of assembly and ease of service.

The modular approach also increases available space that can be used for increased clutch capacity in both forward and direct clutches 16, 30, respectively, beyond what the OE configuration accommodates without sacrificing rigidity. The OE transmission will not accommodate, and the known aftermarket transmissions do not provide, this increased clutch capacity. The additional clutch capacity provided by the present transmission 210 is especially advantageous for high torque racing applications.

It will be appreciated that in first and second gears the sprag shaft 224 and direct piston housing 214 rotate at different speeds relative to each other. With counter-rotation between the sprag shaft 224 and direct piston housing 214 at racing speeds, the rpm differential can approach 20,000 rpm. It will be appreciated that the rpm differential is a multiple of the input rpm and that the differential can approach 20,000 rpm. Although the known aftermarket and the present transmission 210 incorporate an additional set of sealing rings 44 to transfer direct clutch apply oil from the sprag shaft 224 to the direct piston housing 214, the known aftermarket transmission offers no support bushing to support and maintain alignment and rigidity between the sprag shaft 224 and the direct piston housing 214. This lack of support/alignment/rigidity can undermine the effectiveness of the sealing rings 44 resulting in pressure loss and transmission failure due to burned clutches.

The present transmission 210 adds novel bushing support 236 (which is lacking in aftermarket solutions) between the sprag shaft 224 and the direct piston housing 214 to improve alignment, rigidity and support. It has been found that the bushings 236 prevent misalignment, and improve rigidity and support between the sprag shaft 224 and the direct piston housing 214, the lack of which could otherwise compromise the effectiveness of the pressurized seals. This is especially true with high torque and at high rotational speeds. Other configurations for providing this additional support/alignment/rigidity will be recognized by those skilled in the are and are within the scope and spirit of the present disclosure.

Another advantage over the OE and known aftermarket transmissions is that the present transmission 210 utilizes the full length of the sunshaft 36 spline to engage the sprag shaft 224 internal spline. With such a configuration, the direct clutch hub 226 is splined directly to the sprag shaft 224 with a much larger diameter, more teeth and a stronger spline. This is a significant improvement over the OE and known aftermarket transmissions. It will be appreciated that the direct clutch hub 226 can be engaged to the sprag shaft 224 in other ways including but not limited to threading, screws, bolts, drive dogs, set-screws, drive pins, press fit, welding, and the like. In the known aftermarket transmission the direct clutch hub 136 and the sprag shaft 138 are both splined directly to the sun shaft 116, which permits only minimal spline engagement of these parts, which limits the torque capacity of the known aftermarket transmissions.

Weight reduction has been a goal in the industry generally, addressed by using lighter weight materials such as aluminum, titanium and other lighter weight materials. The present transmission 210 is sufficiently robust to incorporate lightweight materials and to further reduce weight through the removal of material in strategic locations. For example, this "swiss cheese" effect is accomplished by drilling through holes, bottoming holes and otherwise coring out areas without sacrificing overall required strength where it is needed. Neither the OE nor the known aftermarket transmission reduce the weight of parts through this selective material removal.

Moreover, it will also be appreciated that although there is still some counter-rotation in the present transmission 210 when in certain gears, because the present transmission eliminates the direct drum of the OE transmission, (which OE transmission direct drum is a large and relatively high-weight component, typically cast iron or steel) there is less mass to stop and reverse when changing gears.

Still another advantage of the present transmission is the use of a single shared pressure plate 234 against which both the forward clutch 16 and the direct clutch 3 are applied when engaged. The pressure plate 234 has external splines that mate with the internal spline of the drum 218 and is located in a central location inside the drum 218 and is held in place with one or two snap rings 238.

Further still, in the OE and aftermarket transmissions, the direct piston 40, 135, is free to rotate inside the direct piston housing 14, 134 when the piston housing rotation is stopped or started during gear shifts. This causes wear in the housing bore that can damage piston seals or cause the spring retainer to fail resulting in catastrophic damage. The present transmission avoids possible failure scenario by using one or more splines or tangs on the piston that engage the internal spline of the drum to function as anti-rotation tabs. In addition to splines or tangs, guide pins, dog points, and the like to accomplish anti-rotation.

Under racing conditions, which are often extreme, the OE transmission intermediate roller clutch outer race 24 has been observed to fail due to the shock load of halting the rotational momentum of the direct drum 14. In the known aftermarket transmission this is addressed by incorporating a larger sprag assembly 38. The present transmission 210 employs an improved power flow to significantly reduce the shock load on the sprag 228, 230, 232, it also incorporates a larger sprag. And, the inner sprag race 232 is incorporated as part of the sprag shaft 224 itself, although it can be a separate member splined to or otherwise pressed or attached to the sprag shaft 224.

And, the present transmission includes thrust needle bearings 240 on both faces of the forward clutch hub 222 where the OE transmission uses thrust washers. The needle thrust bearings add strength, reduce friction and wear, and run cooler.

Figure 4:
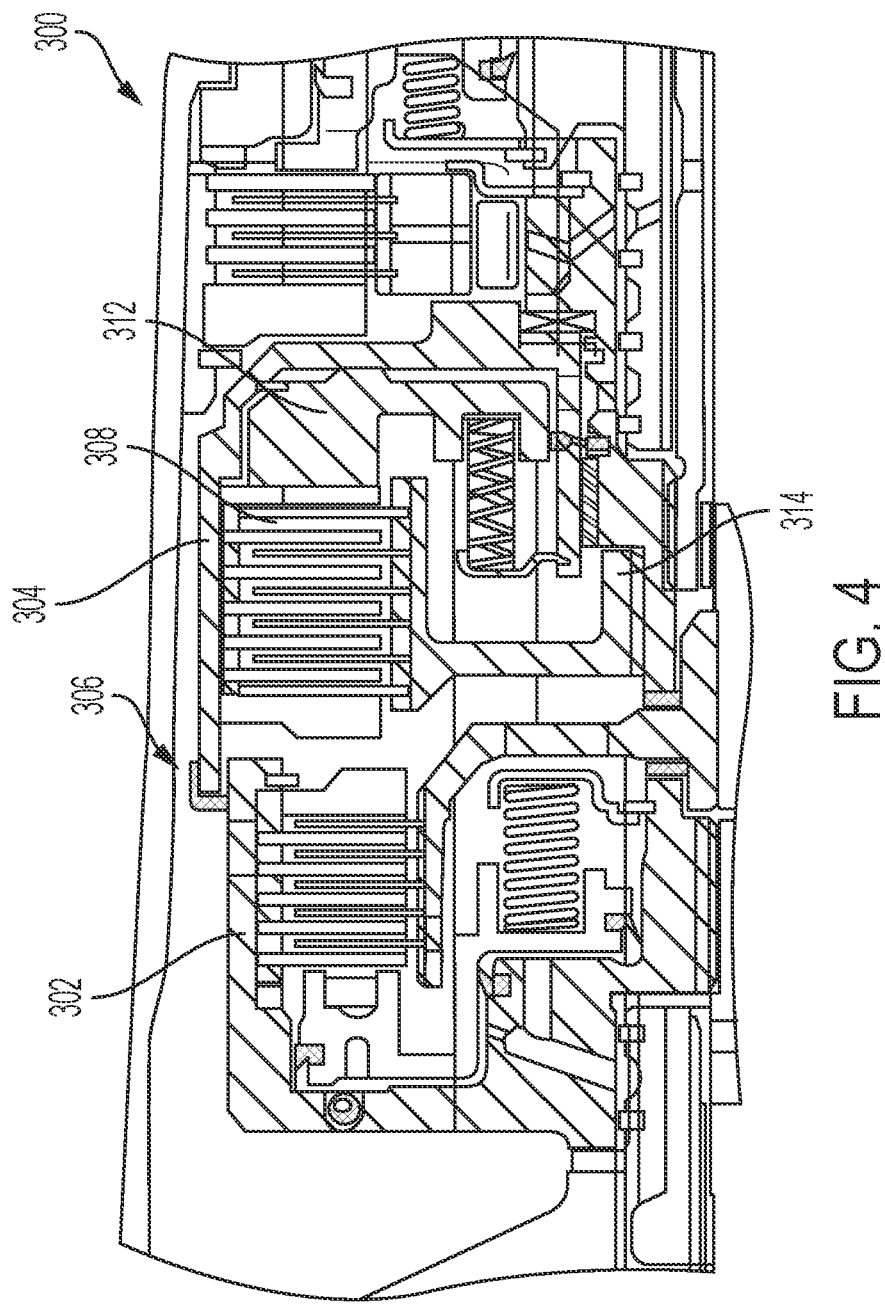
FIG. 4 is a diagram illustrating an upper half of a transmission for a vehicle according another embodiment.

FIG. 4 illustrates another embodiment of a modified vehicle transmission 300. In FIG. 4, the transmission 300 includes a forward clutch drum 302 and a direct clutch drum 304, and a direct clutch 308 an direct clutch piston 312. The drums 302, 304 are separate from one another, but are joined to one another at about an outer periphery of the drums as indicated at 306. In this manner the drums 302, 304 rotate together. The direct clutch 304 can be made larger (larger diameter) which allows the use of larger clutches 308, thus providing increased clutch capacity. Further, in this an embodiment, an OE or a modified forward drum 302 can be used with a replacement direct drum 304. It will also be appreciated that larger clutches 308 can be accommodated because there is no spline interface between the direct drum 304 and an outer housing (the drum 218 and spline interface indicated at 242 in FIG. 3). A kit can include any or all of the above-noted components.

Figure 5:
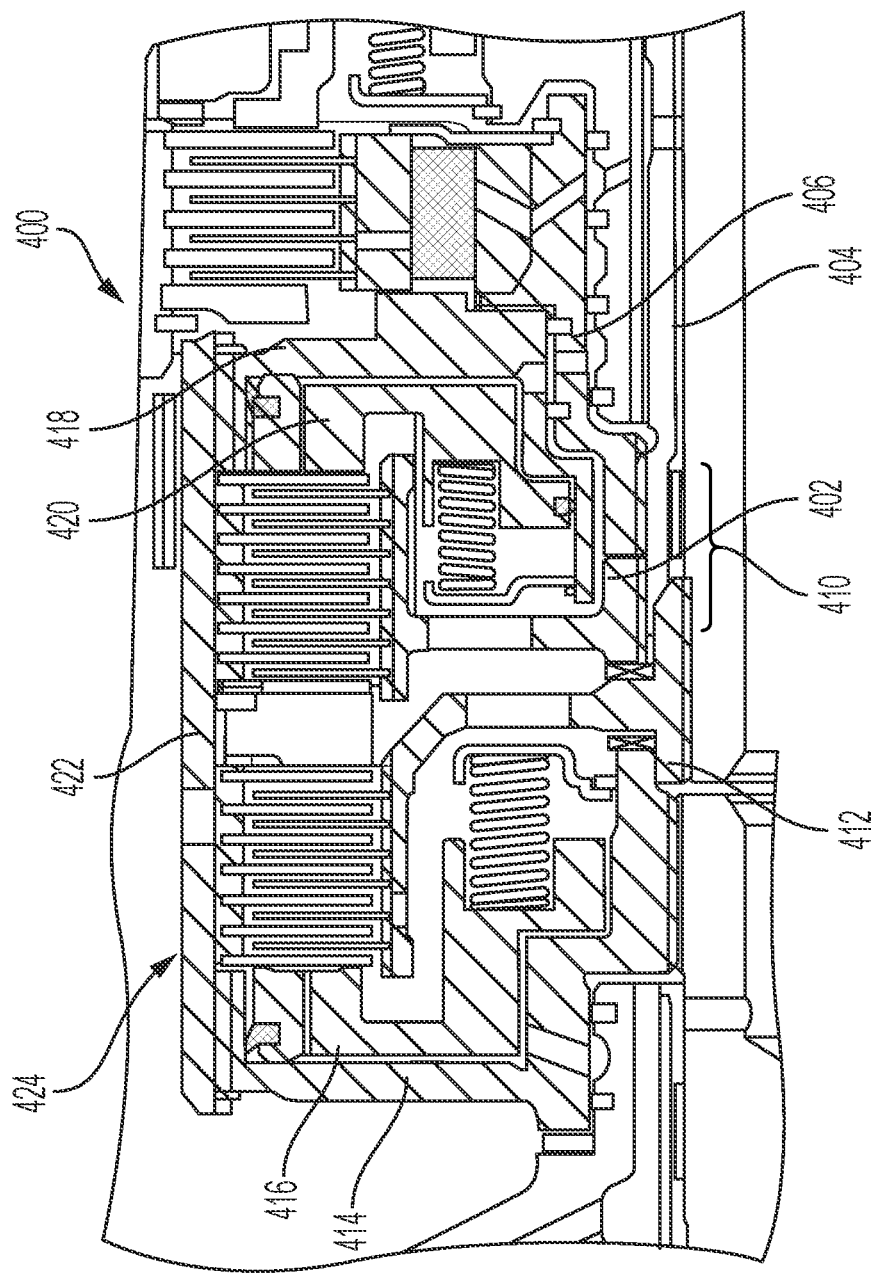
FIG. 5 is a diagram illustrating an upper half of a transmission for a vehicle according still another embodiment.

FIG. 5 illustrates yet another modified transmission 400 similar to the embodiment of FIG. 3. This embodiment includes a forward piston housing or drum 414, a forward piston 416, a forward clutch hub 412, a direct piston housing or drum 418, a direct piston 420 and a direct clutch hub 402. A drum 422 is positioned between and connects the forward and direct piston drums 414, 418. In embodiments, the sprag shaft 406 and the direct clutch hub 402 are splined to the sun shaft 404. Certain of the components can be assembled as a module, as indicated at 424. A kit can include any or all of the above-noted components, including for example, the module.

Figure 2:
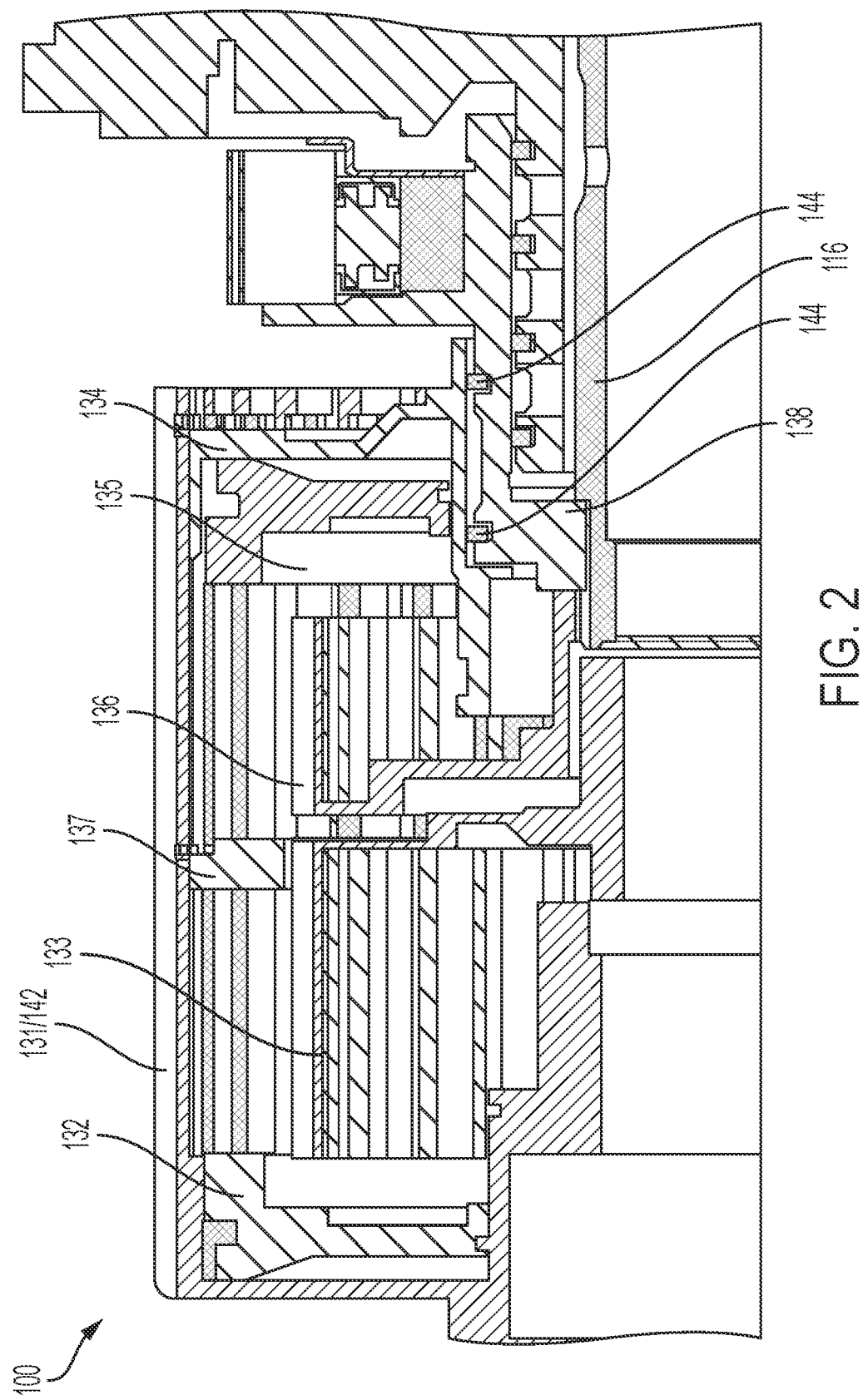
FIG. 2 is a diagram illustrating a known aftermarket modification of the OE transmission of FIG. 1.

In this embodiment, the direct clutch hub 402 is splined to the sun shaft 404 rather than to the sprag shaft 406. It will be understood from FIG. 5 that in this embodiment, both the direct clutch hub 402 and the sprag shaft 406 are splined directly to the sun shaft 404, and can be splined to the sun shaft 404 along a lengthened spline (as indicated at 410) due to the shortened forward clutch hub 412. As with the embodiment of FIG. 3, in this embodiment of FIG. 5, the alternate spline arrangement 410 provides an increased capacity compared to the known aftermarket transmission of FIG. 2.

A method of modifying an OE or aftermarket transmission includes, in an OE or aftermarket transmission case, installing a forward piston housing 212, a forward piston 216 and a forward clutch hub 222. The method may further include installing in the OE or aftermarket transmission case, a direct piston housing 214, a direct piston 220 and a direct piston clutch hub 226. Replacement forward and direct clutches 16, 30 may also be installed.

In methods, a drum 218 is mounted between and operably connects the forward piston housing 212 and the direct piston housing 214 and the drum 218 is secured between and to the forward and direct piston housings 212, 214. The drum 218 can be secured by snap rings, threading, screws, pins, rivets, set screws and the like.

In some methods a pressure plate 234 is positioned between the forward clutch 16 and the direct clutch 30. In some methods an input shaft 32 is operably mounted to the forward piston housing 212, the direct clutch hub 226 is mounted to a sprag shaft 224, and the sprag shaft 224 is operably mounted to the sun shaft 36. Mounting the input shaft 32 to the forward piston housing 212, mounting the direct clutch hub 226 to the sprag shaft 224, and mounting the sprag shaft 224 to the sun shaft 36 can be, for example, b s lining.

The method can also include the provision of a bushing support 236 between the sprag shaft 224 and the direct piston housing 214 for additional alignment, support, and rigidity between the sprag shaft 224 and the direct piston housing 214. Further still, the method can include the installation of needle bearings 240 on both faces of the forward clutch hub 222 to add strength, reduce friction and wear, and run cooler.

It will be appreciated that some of the components can be configured in a modular assembly and that the modification can be accomplished by installation of a preconfigured module 211 in the OE or aftermarket transmission case. For example, the forward piston housing 212, forward piston 216, forward clutch hub 222, direct piston housing 214, direct piston 220 and direct piston clutch hub 226 can be configured as a module 211. The module can include replacement forward and direct clutches 16, 30 and a sprag shaft 224.

The module 211 can be configured such that the drum 218 is mounted between and operably connects the forward piston housing 212 and the direct piston housing 214, and can be secured to the housings 212, 214 by snap rings, threading, screws, pins, rivets, set screws and the like. The module 211, as installed, can include the pressure plate 234 positioned between the forward clutch 16 and the direct clutch 30.

In some methods of modular installation, the input shaft 32 is operably mounted to the module 211 at the forward piston housing 212 and the sprag shaft is mounted to the sun shaft 36. Mounting the module to the shafts 32, 36 can be by splining.

Some methods of modifying an OE or aftermarket transmission can include, in the OE or aftermarket transmission case, installing a direct clutch drum or housing 304, a direct piston 312 and a may include installing a direct clutch hub 314 and clutch 308. The method includes mounting the direct clutch drum 304 to the forward clutch drum 302. The method may include installing a replacement forward clutch drum 302 and or modifying the forward clutch drum for mounting the forward clutch drum 302 to the direct clutch drum 304 so that the drums 302, 304 rotate together. It will be appreciated that this configuration can eliminate the spline interface (shown at 242 in FIG. 3), and as such a larger and larger capacity clutch 308 can be used.

In a method of modifying an OE or aftermarket transmission, in the OE or aftermarket transmission case, a forward piston housing or drum 414, a forward piston 416, a forward clutch hub 412, a direct piston housing or drum 418, a direct piston 420 and a direct clutch hub 402 are installed. A drum 422 is installed between and connects the forward and direct piston drums 414, 418. A sprag shaft 406 is installed and is splined to the sun shaft 404. The direct clutch hub is also splined directly to the sun shaft 404 (rather than via the sprag shaft 406). In this method, certain of the components can be assembled as a module, as indicated at 424, and the module 424 installed in the transmission case.

In the embodiments above, it will be appreciated that where a specific connection between features which are described as driving or being driven by the other, or similar description indicative of a mechanical connection between the features, that the connection may be, for example, a splined connection, a geared connection, a friction connection or other known mechanical connection suitable for allowing one feature to drive or be driven by another.

It is understood that the features described with respect to any of the embodiments above may be implemented, used together with, or replace features described in any of the other embodiments above. It is also understood that description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, it is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A power flow module for an original equipment (OE) vehicle automatic transmission, comprising:
    a forward piston housing;
    a forward clutch hub and a forward clutch;
    a direct piston housing;
    a direct clutch hub and a direct clutch;
    a drum extending between and operably connecting the forward piston housing and the direct piston housing;
    a sprag shaft;
    a sun shaft, and
    a bushing support between the direct piston housing and the sprag shaft,
    wherein the forward clutch hub and the forward clutch and the direct clutch hub and the direct clutch are positioned between the forward piston housing and the direct piston housing, and wherein at least a portion of the forward clutch and at least a portion of the direct clutch are operably mounted to the drum,
    wherein the forward piston housing and the direct piston housing do not counter rotate relative to one another, and
    wherein the direct clutch hub is splined to the sprag shaft at an outside diameter of the sprag shaft and wherein the sprag shaft is splined to the sun shaft at an inside diameter of the sprag shaft.

2. The power flow module of claim 1, further including a forward piston and a direct piston, wherein the forward piston is positioned in the forward piston housing and the direct piston is positioned in the direct piston housing.

3. The power flow module of claim 1, further including an intermediate clutch operably connected to the sprag shaft.

4. The power flow module of claim 1, further including a pressure plate positioned between the forward clutch and the direct clutch.

5. The power flow module of claim 4, wherein the pressure plate cooperates with both the forward clutch and the direct clutch.

6. The power flow module of claim 1, further including a needle bearing positioned between the forward piston housing and the forward clutch hub.

7. The power flow module of claim 1, further including a needle bearing positioned between the forward clutch hub and the sprag shaft.

\* \* \* \* \*